United States Patent
Chua et al.

(10) Patent No.: US 9,122,160 B2
(45) Date of Patent: Sep. 1, 2015

(54) METHOD AND APPARATUS FOR PERFORMING OPTICAL PROXIMITY AND PHOTOMASK CORRECTION

(71) Applicants: Gek Soon Chua, Singapore (SG); Yi Zou, Foster City, CA (US); Wei-Long Wang, Tainan (TW); Byoung Il Choi, Gyeonggi-do (KR)

(72) Inventors: Gek Soon Chua, Singapore (SG); Yi Zou, Foster City, CA (US); Wei-Long Wang, Tainan (TW); Byoung Il Choi, Gyeonggi-do (KR)

(73) Assignee: GLOBALFOUNDRIES Singapore Pte. Ltd., Singapore (SG)

( * ) Notice: Subject to any disclaimer, the term of this patent is extended or adjusted under 35 U.S.C. 154(b) by 0 days.

(21) Appl. No.: 13/832,557

(22) Filed: Mar. 15, 2013

(65) Prior Publication Data
US 2014/0282299 A1 Sep. 18, 2014

(51) Int. Cl.
*G06F 17/50* (2006.01)
*G03F 1/00* (2012.01)

(52) U.S. Cl.
CPC ............ *G03F 1/144* (2013.01); *G06F 17/5081* (2013.01); *G06F 2217/12* (2013.01); *Y02T 10/82* (2013.01)

(58) Field of Classification Search
CPC ......... G03F 1/0092; G03F 1/36; G06F 17/50; G06F 15/04
USPC ............................... 716/100, 52, 53
See application file for complete search history.

(56) References Cited

U.S. PATENT DOCUMENTS

| | | | |
|---|---|---|---|
| 7,350,183 B2 * | 3/2008 | Cui et al. | 716/52 |
| 8,423,920 B2 * | 4/2013 | Lee et al. | 716/51 |
| 8,589,830 B2 * | 11/2013 | Chang et al. | 716/53 |
| 2005/0188338 A1 * | 8/2005 | Kroyan et al. | 716/9 |
| 2005/0251771 A1 * | 11/2005 | Robles | 716/5 |
| 2006/0101370 A1 * | 5/2006 | Cui et al. | 716/19 |
| 2013/0239071 A1 * | 9/2013 | Chang et al. | 716/53 |

OTHER PUBLICATIONS

Gek Soon Chua et al., "Optimization of mask shot count using MB-MDP and lithography simulation," Photomask Technology, Proceedings of SPIE, vol. 8166, 816632, 2011, pp. 1-11.
Gek Soon Chua et al., "Optimization of mask shot count using MB-MDP and lithography simulation," SPIE/BACUS Photomask Symposium, Sep. 20, 2011, pp. 1-8.
Gek Soon Chua et al., "Proof Point on MB-MDP & Wafer Quality Simulation," eBeam Initiative Luncheon, Apr. 19, 2012, pp. 1-12.

* cited by examiner

*Primary Examiner* — Thuan Do
(74) *Attorney, Agent, or Firm* — Ditthavong & Steiner, P.C.

(57) ABSTRACT

An approach is provided for enabling simulation of photomask contour shapes, performing verification on the simulated photomask shapes, and correcting errors in OPC correction or bad fracturing methods to perform photomask proximity correction in real time before physically writing of the photomask. Embodiments include performing optical proximity correction of a photomask of a semiconductor layout to generate a corrected photomask, simulating the corrected photomask to generate one or more simulated contour shapes within a simulated photomask, verifying the simulated contour shapes to determine errors associated with the simulated photomask, and correcting the errors in the simulated contour shapes of the simulated photomask to generate a final photomask.

11 Claims, 4 Drawing Sheets

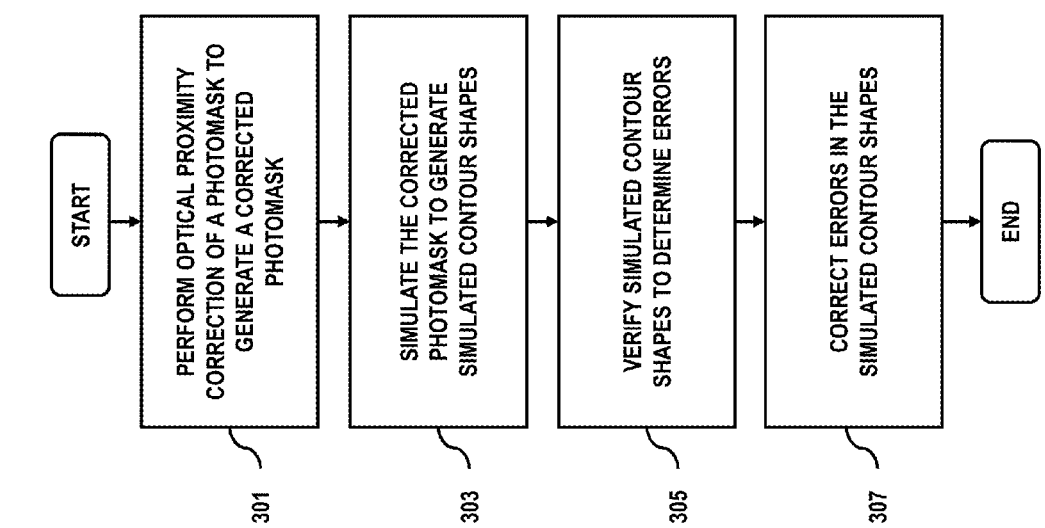

METHOD AND APPARATUS FOR PERFORMING OPTICAL PROXIMITY AND PHOTOMASK CORRECTION

TECHNICAL FIELD

The present disclosure relates to an optical proximity and photomask correction work flow, and in particular, to performing photomask proximity correction by simulating photomask shapes.

BACKGROUND

There currently exists no established work flow that allows for communication between an optical proximity correction (OPC) stage, a lithography stage and a masking stage with respect to processing photomasks in designing semiconductor devices. Rather, OPC modeling assumes that a photomask pattern will be equal to the pattern data without considering the masking process such that the verification of an OPC model is based merely on the pattern data. Such OPC modeling will be overly optimistic and prone to failures that could be catastrophic on semiconductor wafer results.

For example, without taking into consideration e-beam forward and backward scattering as well as photomask process effects of development, baking and etching, the resist edge on a photomask will not be the same as a drawn edge. However, OPC modeling that incorporates photomask process correction is not readily transferable to other photomask houses with different photomask writing and etching processes and different fracturing strategies. For example, each photomask house may have a different e-beam writing tool, fracturing algorithm, etching tool, blanks, and resists. Thus, an OPC model with photomask process correction for mask house A may not be usable by mask house B with a different photomask writing and etching tool set for the same photomask performance. Moreover, mask house error budgets are not taken into consideration during OPC model building. Thus, qualifying and analyzing different mask house processes for a particular node is not as straightforward as qualifying wafer results if the mask house printing performance cannot be isolated.

A need, therefore, exists for methodology and an apparatus enabling three-way communication between an OPC stage, a lithography stage, and a masking stage for performing optical proximity and photomask correction.

SUMMARY

An aspect of the present disclosure is a method for simulating contour shapes of a photomask to verify and correct errors of the simulated contour shapes prior to photomask writing.

Another aspect of the present disclosure is an apparatus for simulating contour shapes of a photomask to verify and correct errors of the simulated contour shapes prior to photomask writing.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: performing optical proximity correction of a photomask of a semiconductor layout to generate a corrected photomask, simulating the corrected photomask to generate one or more simulated contour shapes of a simulated photomask, verifying the simulated contour shapes to determine errors associated with the simulated photomask, and correcting the errors in the simulated contour shapes of the simulated photomask to generate a final photomask.

Aspects of the present disclosure include generating the simulated contour shapes based on simulating a masking process of the corrected photomask. Another aspect includes the simulation of the masking process taking into account at least one of e-beam forward and backward scattering, development, baking, and etching of the corrected photomask. An aspect also includes correcting the errors in the simulated contour shapes by modifying a photomask shot configuration. An additional aspect includes modifying the photomask shot configuration based on at least one of adjusting variable e-beam shapes and including overlapping shots. Yet another aspect includes verifying the simulated contour shapes based on at least one of a process variation band, a photomask error enhancement factor, a depth of focus, and one or more hotspots (weakpoints). A further aspect includes performing lithography simulation on the corrected contour shapes of the final photomask prior to lithography based on the final photomask.

Another aspect of the present disclosure is an apparatus including at least one processor, and at least one memory including computer program code for one or more programs, the at least one memory and the computer program code configured to, with the at least one processor, cause the apparatus to: perform optical proximity correction of a photomask of a semiconductor layout to generate a corrected photomask, simulate the corrected photomask to generate one or more simulated contour shapes of a simulated photomask, verify the simulated contour shapes to determine errors associated with the simulated photomask, and correct the errors in the simulated contour shapes of the simulated photomask to generate a final photomask.

Aspects of the present disclosure include the apparatus being further caused to generate the simulated contour shapes based on simulating a masking process of the corrected photomask. Another aspect includes the simulation of the masking process taking into account at least one of e-beam forward and backward scattering, development, baking, and etching of the corrected photomask. A further aspect includes the apparatus being further caused to correct the errors in the simulated contour shapes by modifying a photomask shot configuration. An additional aspect includes the apparatus being further caused to modify the photomask shot configuration based on at least one of adjusting variable e-beam shapes and including overlapping shots. Yet another aspect includes the apparatus being further caused to verify the simulated contour shapes based on at least one of a process variation band, a photomask error enhancement factor, a depth of focus, and one or more hotspots. Another aspect includes the apparatus being further caused to perform lithography simulation on the corrected contour shapes of the final photomask prior to lithography based on the final photomask.

Another aspect of the present disclosure is a computer-readable storage medium carrying one or more sequences of instructions which, when executed by one or more processors, cause an apparatus to: perform optical proximity correction of a photomask of a semiconductor layout to generate a corrected photomask, simulate the corrected photomask to generate one or more simulated contour shapes of a simulated photomask, verify the simulated contour shapes to determine errors associated with the simulated photomask, and correct the errors in the simulated contour shapes of the simulated photomask to generate a final photomask.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawings and in which like reference numerals refer to similar elements and in which:

FIG. 3 is a flowchart of a process for simulating contour shapes of a photomask to verify and correct errors of the simulated photomask, according to an exemplary embodiment.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves a problem of an inability for an OPC stage, a lithography stage, and a masking stage to communicate to correct errors associated with a photomask attendant upon the production of a semiconductor device. In accordance with embodiments of the present disclosure, a photomask shape verification and a lithography shape simulation performance check are performed prior to writing the mask, after manufacturability consideration.

Methodology in accordance with embodiments of the present disclosure includes: performing optical proximity correction of a photomask of a semiconductor layout to generate a corrected photomask. Next, the corrected photomask is simulated to generate one or more simulated contour shapes. Then, the simulated contour shapes are verified to determine errors associated with the simulated photomask. Subsequently, errors found with respect to the simulated contour shapes are corrected within the simulated photomask to generate a final photomask.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and description are to be regarded as illustrative in nature, and not as restrictive.

Figure 1:
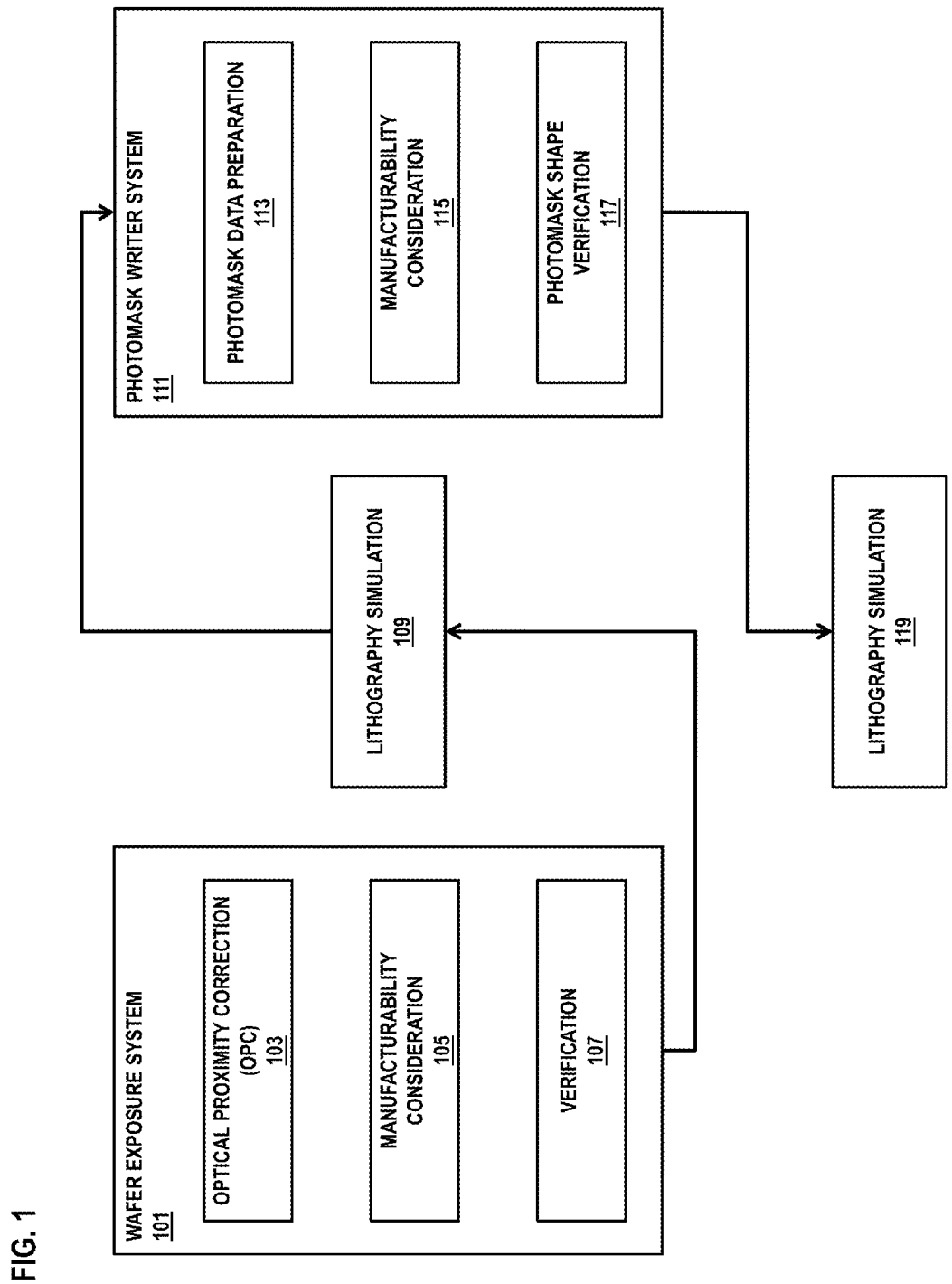
FIG. 1 schematically illustrates an overall system flow for simulating contour shapes of a photomask to verify and correct errors of the photomask, according to an exemplary embodiment.

FIG. 1 schematically illustrates an overall system flow for simulating contour shapes of a photomask to verify and correct errors of the simulated contour shapes prior to photomask writing, according to an exemplary embodiment. Initially, the wafer exposure system 101 performs conventional pattern correction for processing the production of a semiconductor wafer. The wafer exposure system 101 may include optical proximity correction (OPC) 103. The OPC 103 may either be rule based, model based, or both. As commonly known in the art, OPC 103 is used to compensate for image errors due to diffraction or process effects as a result of the limitations of light to maintain an edge. Particularly, the limitations of light cause irregularities including shapes that are narrower or wider than designed. These errors are amenable to compensation by changing the pattern on the photomask used for imaging.

The wafer exposure system 101 may further include manufacturability consideration 105. The manufacturability consideration 105 may include one or more of a photomask rule check (MRC), OPC runtime, and manhattanizing for photomask writing. After the manufacturability consideration 105, the wafer exposure system 101 includes verification 107. Here, verification of the wafer is performed, including verifying one or more of a process variation (PV) band, a photomask error enhancement factor (MEEF), a depth of focus (DOF), and determination of hotspots or errors. The PV band may be used to compare the sensitivity of a layout by performing multiple process window analyses with different process variations. Further, the DOF may be the total range of focus that can be tolerated that keeps a resulting printed feature within 10% of the critical dimension variation specifications.

After verification, lithography simulation 109 may be performed on the wafer regarding various requirements, such as bridging, necking, line-end/space-end pullback, gate length critical dimension uniformity (CDU), vertical interconnect access (VIA) enclosures, contrast, and MEEF. The lithography simulation 109 allows for the capturing of catastrophic failures prior to the photomask being taped out. Failures that are detected will be fed back to the OPC 103 for re-spin. If the lithography simulation performance passes all requirements, full-chip OPC data will be released to the photomask writer system 111.

The photomask writer system 111 elaborates on the post OPC correction tapeout treatment before releasing the photomask data for photomask writing. The photomask writer system 111 may include photomask data preparation 113. The photomask data preparation 113 may include MRC/fracturing for inspection, pattern correction for the photomask, and fracturing/formatting.

Following the photomask data preparation 113, the photomask writer system 111 may include manufacturability consideration 115. Conventionally, the manufacturability consideration 115 may account for photomask grids and photomask shot counts. However, based on the ability to simulate contour shapes of a photomask to verify and correct errors of the simulated contour shapes prior to photomask writing, the manufacturability consideration 115 also may include the determination of overlapping shots and photomask process correction (MPC) via dose modulation.

Unlike conventional processing, after the manufacturability consideration 115, the photomask writer system 111 includes photomask shape verification 117 where photomask proximity correction is performed via a simulation. The photomask is simulated, including all of the various contour shapes that constitute the photomask. By simulating the photomask and the contour shapes, the simulated photomask may be verified and allow for producing the OPC corrected contour shapes on the photomask plane with more flexibility. Using the verification, the e-beam photomask shape can be re-shaped to correct previous OPC correction and improve weak points and yield, which may not necessarily be limited to an inverse lithography technology (ILT) photomask but may be made for any type of general photomask. Furthermore, the simulated photomask including the simulated contour shapes allows for the recognition of differences between the OPC-desired contour shapes, and hotspots (e.g., weakpoints) can be identified and corrected before photomask writing, thereby minimizing the need for photomask retro-fit and additional wafer print down to correct for the OPC.

With the flexibility to adjust the photomask shape at this point in the process flow, several benefits may also be achieved. For example, by adjusting variable e-beam shapes and allowing overlapping shots, photomask contour shapes can be verified using simulation for the lithography performance for trade-off of photomask shot count reduction. Further, while an OPC model that integrates MPC is not readily transferrable to another photomask house with different photomask writing and etching processes (as discussed above), in addition to the runtime for OPC with MPC being computationally intensive, by simulating the photomask and performing verification on the photomask simulation based on a particular taped-out photomask house, any repair can be executed by manipulating the photomask shot configuration. Integrating photomask verification and correction provides a pathway to model and qualify e-beam blur, backscattering related to proximity effect correction (PEC), fogging effect correction (FEC), and loading effect correction (LEC) on the e-beam writer and photomask processing effects to modify photomask shape. Verification is also performed on the simulated photomask, specifically the various contour shapes that constitute the photomask. Similar to the verification performed at the wafer exposure system 101, the verification may include analysis of one or more of a process variation (PV) band, a photomask error enhancement factor (MEEF), a depth of focus (DOF), and checking for one or more hotspots or errors.

Figure 2A:
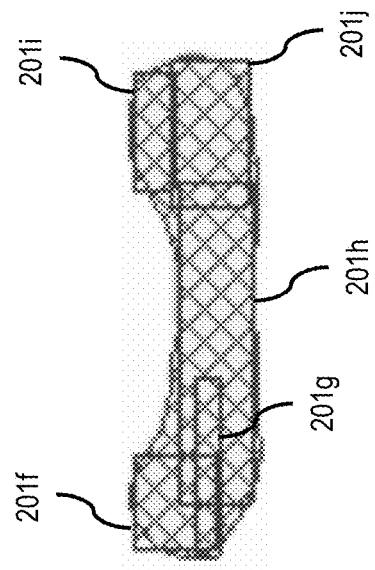
FIGS. 2A and 2B are diagrams illustrating a necking-prone site, according to various exemplary embodiments.
Figure 2B:
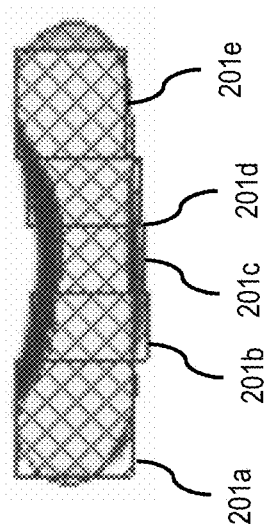

For example, FIG. 2A illustrates the danger of a necking-prone site. FIG. 2B illustrates diminishing the necking-prone site by adding additional shots (represented by the rectangular shapes 201f-201j) that overlap the existing shot configuration (represented by rectangular shapes 201a-201e in FIG. 2A) to increase the dose modulation of photomask write at that particular site so that the necking-prone localized site can be written bigger (favorable for necking) without violating the photomask Rule Check (MRC).

After the simulation and correction of the photomask, in addition to verification of lithography performance via a photolithography simulation 119, conventional processing of a photomask may resume. As such, the photomask transferred to write the photomask on the wafer, which in turn is subsequently analyzed for lithography performance of the written wafer.

FIG. 3 is a flowchart of a process 300 verifying and correcting a simulated photomask, according to an exemplary embodiment. At step 301, OPC is performed on a photomask of a semiconductor layout to generate a corrected photomask. The OPC may be model based, rule based, or a combination thereof. Further, step 301 may be performed at a wafer exposure system 101. As discussed above, the wafer exposure system 101 may perform the OPC to compensate for image errors due to diffraction or process effects as a result of the limitations of light to maintain an edge. After step 301, a corrected photomask is generated that, when drawn on a silicon wafer, will more closely match the photomask.

Subsequently, at step 303, the corrected photomask is simulated to generate a simulated photomask including one or more simulated contour shapes of the photomask. The simulation of the corrected photomask may be model based. The model may be based on simulating the masking process of the corrected photomask taking into account at least one of e-beam forward and backward scattering, development, baking, and etching of the corrected photomask.

At step 305, the simulated contour shapes of the simulated photomask are verified to determine any errors associated with the simulated photomask. The verification may include verification of the PV band, the MEEF, the DOF, and/or determination of hotspots or weakpoints.

Then, at step 307, any errors in the simulated contour shapes of the simulated photomask are corrected to generate a final photomask, if necessary. The errors may be corrected by modifying the mask shot configuration as described above with respect to FIGS. 2A and 2B. Specifically, the errors may be corrected by modifying the mask shot configuration based on at least one of adjusting variable e-beam shapes and including overlapping shots.

After correction of the simulated photomask, a final photomask is generated. If the final photomask passes lithography simulation, the final photomask is passed to a photomask writing stage where the conventional processing steps are resumed in producing a full semiconductor chip.

Figure 4:
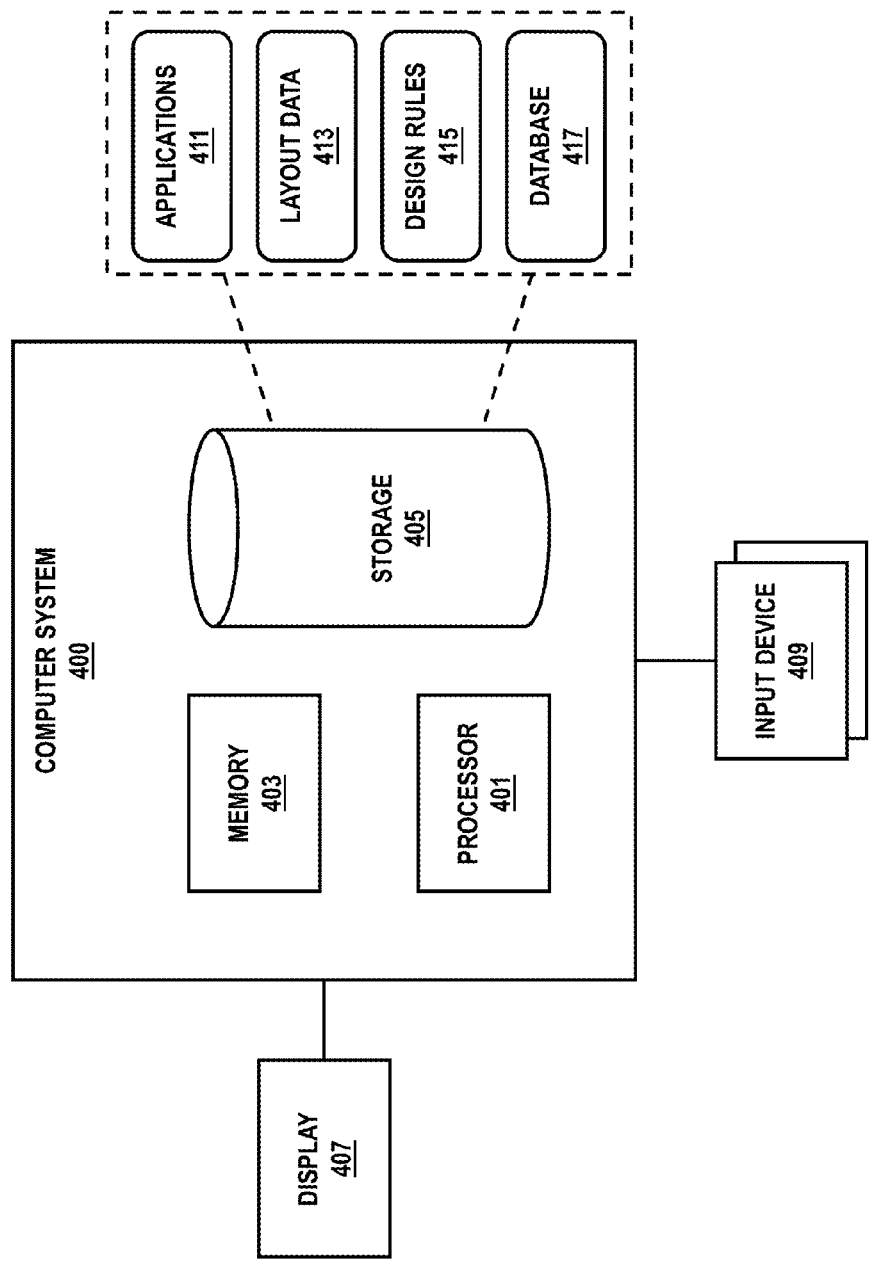
FIG. 4 schematically illustrates a computer system for implementing the process of FIG. 3, according to an exemplary embodiment.

The processes described herein may be implemented via software, hardware, firmware, or a combination thereof. Exemplary hardware (e.g., computing hardware) is schematically illustrated in FIG. 4. As shown, computer system 400 includes at least one processor 401, at least one memory 403, and at least one storage 405. Computer system 400 may be coupled to display 407 and one or more input devices 409, such as a keyboard and a pointing device. Display 407 may be utilized to provide one or more GUI interfaces. Input devices 409 may be utilized by users of computer system 400 to interact with, for instance, the GUI interfaces. Storage 405 may store applications 411, layout data (or information) 413, design plus rules 415, and at least one shape database (or repository) 417. Applications 411 may include instructions (or computer program code) that when executed by processor 401 cause computer system 400 to perform one or more processes, such as one or more of the processes described herein. In exemplary embodiments, applications 411 may include one or more manufacturability analysis and/or yield enhancement tools.

The embodiments of the present disclosure can achieve several technical effects, including significant cost-savings from shortening the production cycle, reducing OPC re-spins, the number of silicon spins and the time to market for any new technology by incorporating photomask shape verification for quality check and perform photomask shape correction for weak points before photomask write and wafer verification. The present disclosure enjoys industrial applicability associated with the designing and manufacturing of any of various types of semiconductor devices used in microprocessors, smart phones, mobile phones, cellular handsets, set-top boxes, DVD recorders and players, automotive navigation, printers and peripherals, networking and telecom equipment, gaming systems, and digital cameras.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
    performing optical proximity correction of a photomask of a semiconductor layout to generate a corrected photomask;
    generating simulated contour shapes based on simulating a masking process of the corrected photomask;
    verifying the simulated contour shapes, by a processor, to determine errors associated with the simulated photomask; and
    correcting the errors in the simulated contour shapes of the simulated photomask to generate a final photomask,
    wherein the verifying the simulated contour shapes is based on at least one of a process variation band, a mask error enhancement factor, a depth of focus, and one or more hotspots; and
    wherein the simulation of the masking process takes into account at least one of e-beam forward and backward scattering, development, baking, and etching of the corrected photomask.

2. A method according to claim 1, comprising correcting the errors in the simulated contour shapes by modifying a mask shot configuration.

3. A method according to claim 2, further comprising modifying the mask shot configuration based on at least one of adjusting variable e-beam shapes and including overlapping shots.

4. A method according to claim 1, further comprising performing lithography simulation on the corrected contour shapes of the final photomask prior to lithography based on the final photomask.

5. An apparatus comprising:
    at least one processor; and
    at least one memory including computer program code for one or more programs,
    the at least one memory and the computer program code configured to, with the at least one processor, cause the apparatus to:
        perform optical proximity correction of a photomask of a semiconductor layout to generate a corrected photomask;
        generate simulated contour shapes based on simulating a masking process of the corrected photomask;
        verify the simulated contour shapes to determine errors associated with the simulated photomask; and
        correct the errors in the simulated contour shapes of the simulated photomask to generate a final photomask,
        wherein the apparatus is further caused to verify the simulated contour shapes based on at least one of a process variation band, a mask error enhancement factor, a depth of focus, and one or more hotspots; and
        wherein the simulation of the masking process takes into account at least one of e-beam forward and backward scattering, development, baking, and etching of the corrected photomask.

6. An apparatus of claim 5, wherein the apparatus is further caused to correct the errors in the simulated contour shapes by modifying a mask shot configuration.

7. An apparatus of claim 6, wherein the apparatus is further caused to modify the mask shot configuration based on at least one of adjusting variable e-beam shapes and including overlapping shots.

8. An apparatus of claim 5, wherein the apparatus is further caused to perform lithography simulation on the corrected contour shapes of the final photomask prior to lithography based on the final photomask.

9. A non-transitory computer-readable storage medium carrying one or more sequences of instructions which, when executed by one or more processors, cause an apparatus to:
    perform optical proximity correction of a photomask of a semiconductor layout to generate a corrected photomask;
    generate simulated contour shapes based on simulating a masking process of the corrected photomask;
    verify the simulated contour shapes to determine errors associated with the simulated photomask; and
    correct the errors in the simulated contour shapes of the simulated photomask to generate a final photomask,
    wherein the apparatus is caused to verify the simulated contour shapes based on at least one of a process variation band, a mask error enhancement factor, a depth of focus, and one or more hotspots; and
    wherein the simulation of the masking process takes into account at least one of e-beam forward and backward scattering, development, baking, and etching of the corrected photomask.

10. A computer-readable storage medium of claim 9, wherein the apparatus is caused to correct the errors in the simulated contour shapes by modifying a mask shot configuration.

11. A computer-readable storage medium of claim 10, wherein the apparatus is caused to further modify the mask shot configuration based on at least one of adjusting variable e-beam shapes and including overlapping shots.

* * * * *